(12) United States Patent
Rinderle

(10) Patent No.: US 9,010,312 B1
(45) Date of Patent: Apr. 21, 2015

(54) SPORTSMANS EZ GRILL

(71) Applicant: Gary E. Rinderle, Clidton, CO (US)

(72) Inventor: Gary E. Rinderle, Clidton, CO (US)

( * ) Notice: Subject to any disclaimer, the term of this patent is extended or adjusted under 35 U.S.C. 154(b) by 0 days.

(21) Appl. No.: 14/520,655

(22) Filed: Oct. 22, 2014

(51) Int. Cl.
*A47J 33/00* (2006.01)

(52) U.S. Cl.
CPC ................................. *A47J 33/00* (2013.01)

(58) Field of Classification Search
CPC ................. A47J 2037/077; F24B 1/205
USPC ........................... 126/30, 9 R, 40, 29
See application file for complete search history.

(56) References Cited

U.S. PATENT DOCUMENTS

| | | | |
|---|---|---|---|
| 1,234,159 A * | 7/1917 | Hannum | 99/443 R |
| 1,266,588 A * | 5/1918 | Hanson | 126/30 |
| 2,621,007 A * | 12/1952 | Barbin | 248/125.1 |
| D186,487 S | 10/1959 | Brooks | |
| D191,186 S | 8/1961 | Maki | |
| 3,837,328 A * | 9/1974 | Schaffer | 126/29 |
| 4,538,589 A | 9/1985 | Preston | |
| 4,896,651 A | 1/1990 | Kott, Jr. | |
| 4,979,490 A | 12/1990 | Nudo et al. | |
| 5,117,806 A | 6/1992 | Soat | |
| 5,307,797 A | 5/1994 | Kleefeld | |
| 5,406,931 A * | 4/1995 | Montgomery | 126/30 |
| D369,939 S | 5/1996 | Gibbs | |
| D457,029 S | 5/2002 | Wickizer | |
| 6,640,797 B1 | 11/2003 | Magers | |
| 7,004,160 B1 | 2/2006 | Bates | |
| 7,007,687 B2 | 3/2006 | Lewis | |
| 7,013,885 B2 | 3/2006 | Czajkoski | |
| 7,980,241 B1 | 7/2011 | White | |
| 8,151,784 B2 | 4/2012 | Czajkoski | |
| 2009/0211563 A1 | 8/2009 | Blackshear et al. | |

* cited by examiner

*Primary Examiner* — Avinash Savani
(74) *Attorney, Agent, or Firm* — Luis Figarella

(57) ABSTRACT

The foldable Sportsman EZ grill is described. The Sportsman EZ portable grill has a grill member and a frame. The frame supports the Sportsman EZ grill on a support surface, keeping the front legs away from the fire/heat source, extending outwardly and in an arch from the frame. The support arms have a distal end and a proximal end. The distal end is joined to the support structure which connects to the grill member.

1 Claim, 7 Drawing Sheets

SPORTSMANS EZ GRILL

PATENTS CITED

The following documents and references are incorporated by reference in their entirety, Gibbs (U.S. Pat. No. D369,939), White (U.S. Pat. No. 7,980,241), Brooks (U.S. Pat. No. D186, 487), Wickizer (U.S. Pat. No. D457,029), Soat (U.S. Pat. No. 5,117,806), Maki (U.S. Pat. No. D191,186), Bates Gibbs (U.S. Pat. No. D369,939), Kleefeld (U.S. Pat. No. 5,307,797), Blackshear et al (U.S. Pat. Pub. No. 2009/0211563), Kott, Jr. (U.S. Pat. No. 4,896,651), Czajkoski (U.S. Pat. Nos. 8,151, 784 and 7,013,885), Preston (U.S. Pat. No. 4,538,589), Nudo et al (U.S. Pat. No. 4,979,980), Magers (U.S. Pat. No. 6,640, 797) and Lewis (U.S. Pat. No. 7,007,687).

FIELD OF THE INVENTION

This invention relates to devices for grilling food over a campfire or other open flame. Furthermore the invention relates to grills which can be used indoors over a fireplace, having a grill stand which makes it possible to position and support the grill member over the burning logs, charcoal or gas.

DESCRIPTION OF THE RELATED ART

Cooking food over an unprepared campfire can be enjoyable, but it is often difficult to find a suitable contrivance to hold the food over the fire. While prepared campfire areas may have built-in grates, the truly wild campfire requires carrying a bulky assembly.

In many locations for outdoor activities, such as parks, beaches or campgrounds, there are permanent grill fixtures or fire pit rings that can be used for cooking or for ambient heat. But even if a built-in grate is provided, it is often unsuitable for a number of reasons; position, height, etc. Built-in grates are often limited in size or only cover part of the open pit, or are constructed such that the heat source and grill assembly are spaced apart a fixed distance. This creates difficulties in cooking different foods having a variety of heating requirements.

What is worst, these outdoor fixtures are frequently damaged or unsanitary because of repeated use without cleaning. In other instances, the outdoor fixtures do not have an assembly for supporting food or the food support is missing or broken. Especially for large groups, there may simply be too little space on the grate to cook everyone's food. Third, it can be difficult and dangerous to place or remove food on a built-in grate, because the fire may unexpectedly flare up and burn the cook's hand.

Thus, there is a need for an adjustable, easy to carry, foldable, campfire grilling device with sufficient space, and with means to easily remove the device from the flame for placing or removing food.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In one aspect the invention is about a folding portable grill comprising a center column assembly comprised of two or more vertical members held together by an upper gripper and a lower gripper, yet provide the ability to rotate each said member around said upper and lower grip point, each said vertical member being held by the lower gripper at said member's near end, each said member forming an arch between the distal and near end, with the apex of each arch being located above said upper gripper, wherein the first vertical member has an arch apex that is higher, and a distal end that is farther out from said center column than that of the second vertical member, and said second vertical member's arch apex is also higher and said distal end farther from the center column that any succeeding member, one or more short legs connect to the lower gripper, a grill member, a grill member height adjustment mechanism connected to at least one said vertical member at a position between said upper and lower grippers. In another aspect, the arch and distal portions of the vertical members are pivotable to a storage position where said member portions nest within each other to the storage position, forming an inside volume, the short legs pivot to lie within said inside volume and the grill member is rotated within said inside volume in the storage position. In yet another aspect, the gripper mechanism stops the motion of the member within it by means of a set screw and a butterfly handle on said screw.

Other features and advantages of the present invention will become apparent upon examining the following detailed description of an embodiment thereof, taken in conjunction with the attached drawings.

Figure 1:
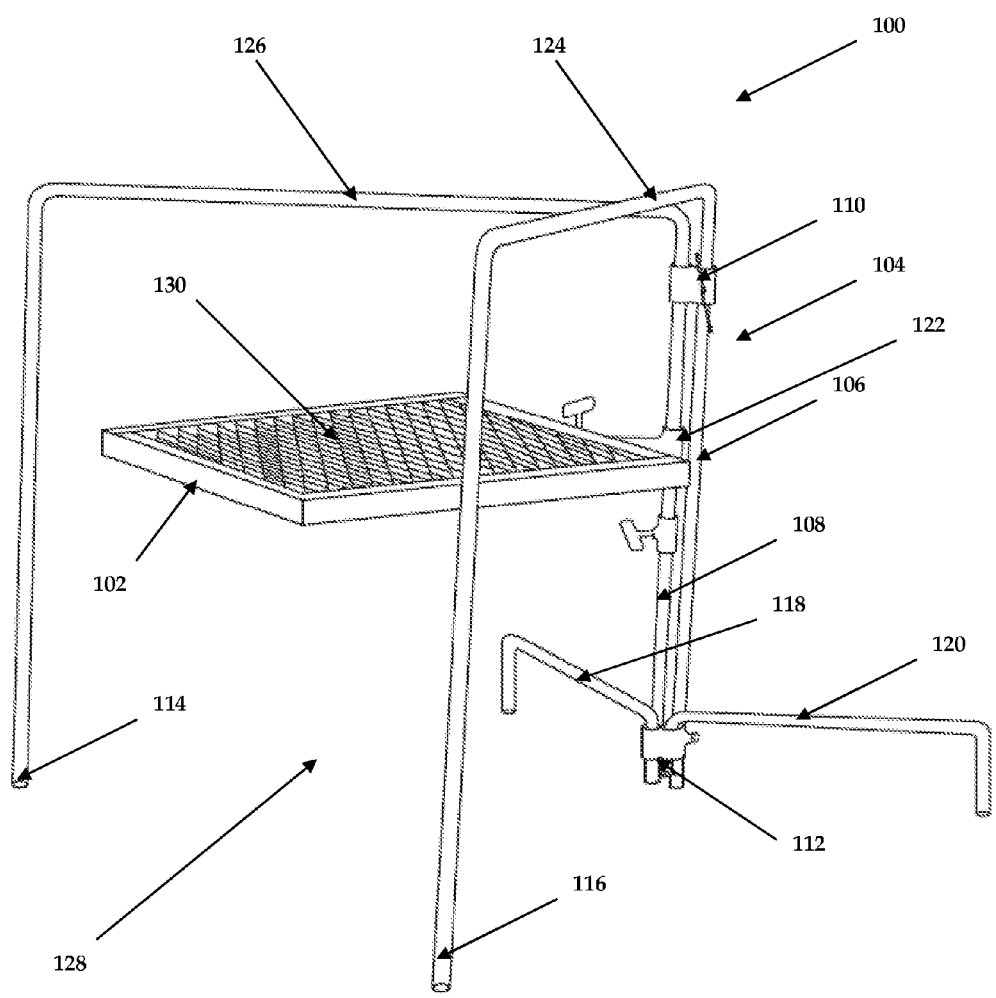
FIG. 1 shows an isometric view of the Sportsman EZ Grill, according to an illustrative embodiment of the invention.
Figure 2:
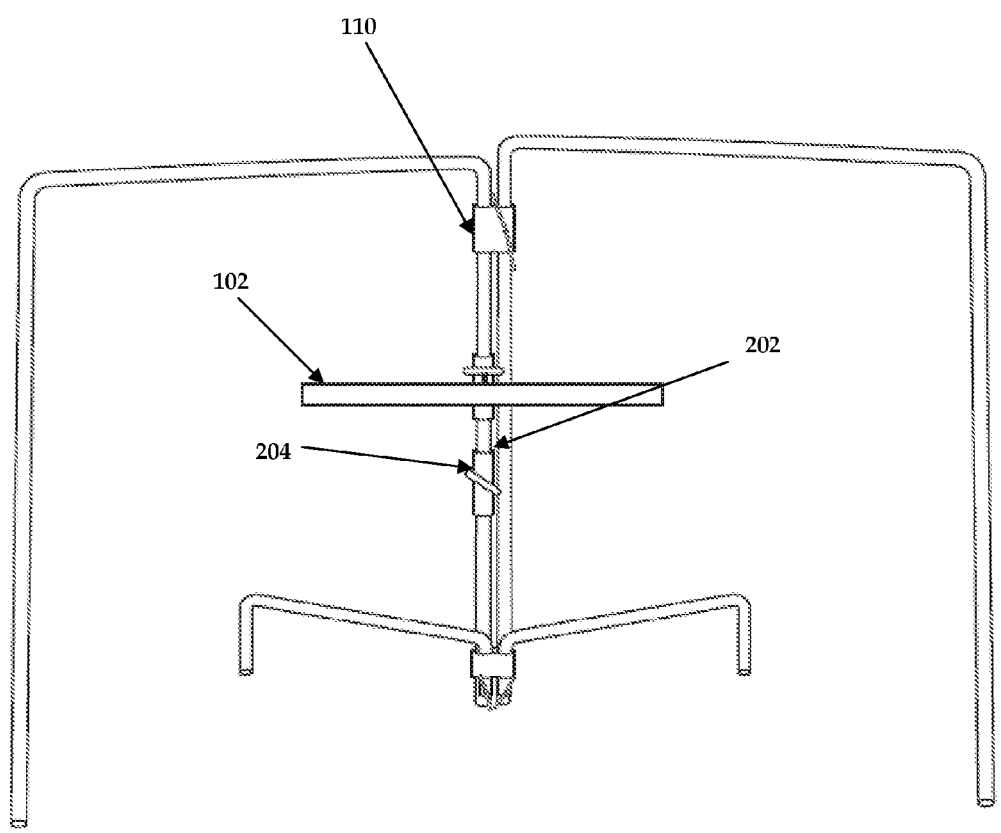
FIG. 2 shows a front view of the Sportsman EZ Grill, according to an illustrative embodiment of the invention.
Figure 3:
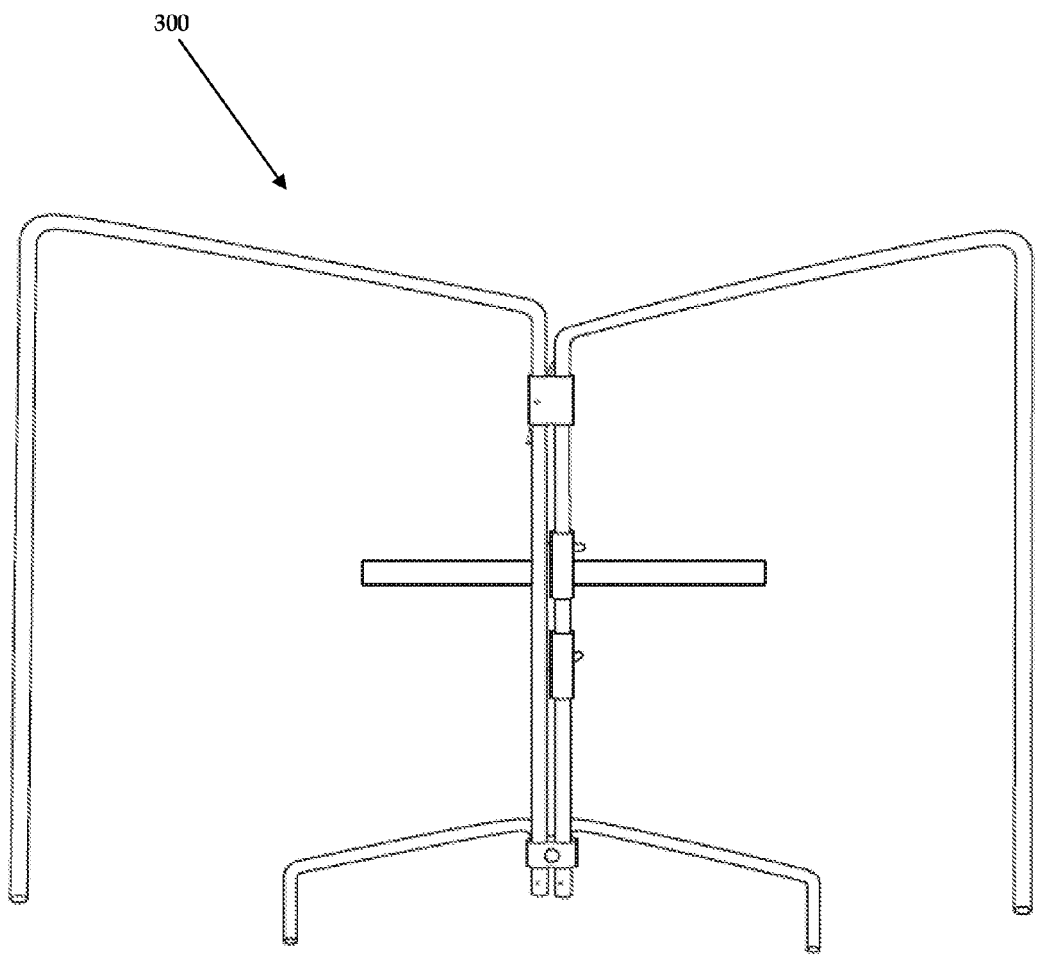
FIG. 3 shows a back view of the Sportsman EZ Grill, according to an illustrative embodiment of the invention.
Figure 4:
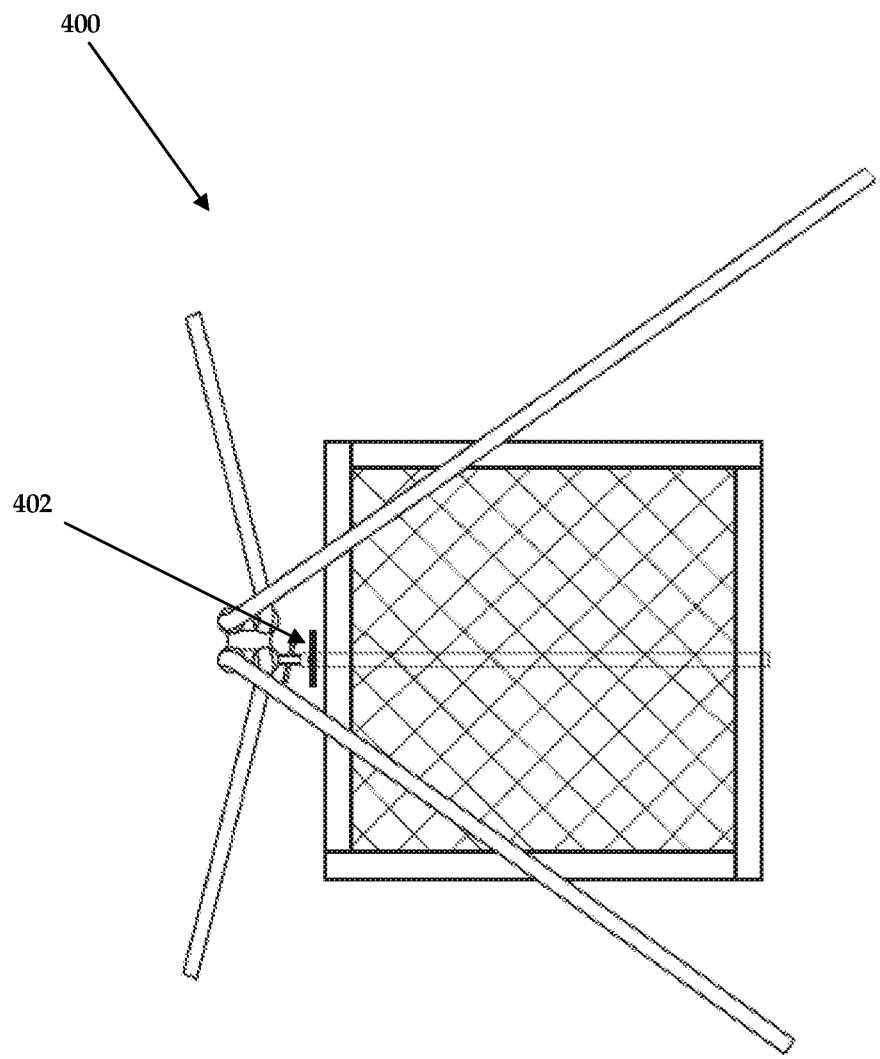
FIG. 4 shows a bottom view of the Sportsman EZ Grill, according to an illustrative embodiment of the invention.
Figure 5:
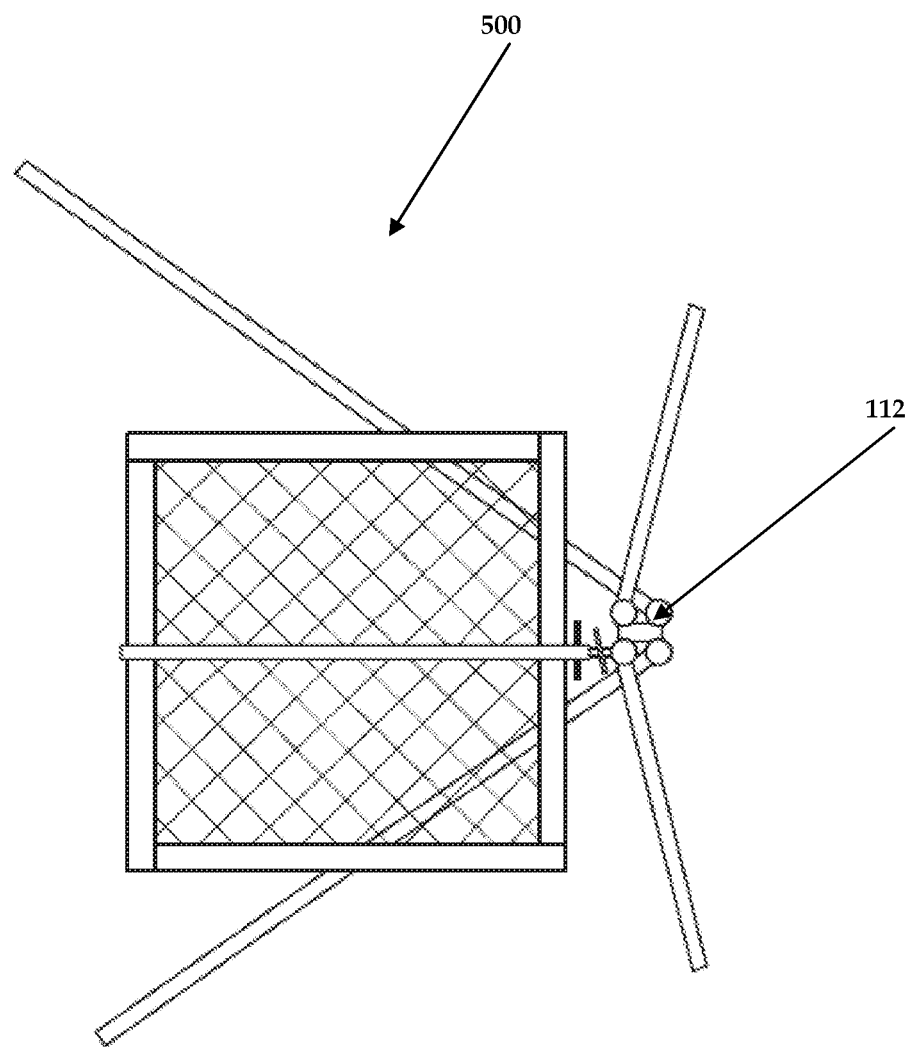
FIG. 5 shows a top view of the Sportsman EZ Grill, according to an illustrative embodiment of the invention.

The above-described and other features will be appreciated and understood by those skilled in the art from the following detailed description, drawings, and appended claims.

DETAILED DESCRIPTION OF THE PREFERRED EMBODIMENT

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

Simplifications or omissions may be made to avoid obscuring the purpose of the section. Such simplifications or omissions are not intended to limit the scope of the present invention. All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

The present invention refers to Sportsman EZ Grill FIG. 1, a portable, collapsible stand and grill assembly. In one embodiment 100, the grill comprises a frame for supporting one or more grill support surfaces 102 over a fire or other intense heat source. The frame includes an upright center column assembly 104 formed by the pairing of two or more 106, 108 vertical members, vertically held together by at least two tubular member grippers, an upper gripper 110 and a lower gripper 112. Each vertical member 106, 108 combines to form a central axis whose members each form individual arches 124, 126 that extend to the front of the assembly, so that each respective distal end 114, 116 of said arches forms an extended support leg 114, 116.

The upper tubular gripper 110 is a dual assembly capable of holding two tubular members parallel to each other. The lower tubular gripper 112 has in one embodiment a four element gripper, in order to hold the vertical members 106, 108 as well as one or more short legs 118, 120, so that these short legs may be added to the unit to increase its stability when deployed in a direction opposite from the fire 128.

The grill 100 also includes a height adjusting mechanism 122 to raise and lower the flat grill member 102 over a campground fire. Said mechanism 122 is located between the upper and lower gripper mechanisms. The grill includes an antiteetering support system comprised of the combined separation of the front legs or vertical member arch distal ends 114, 116, in combination with the location of the one or more short legs 118, 120 in the rear. These one or more rear legs 118, 120 are rigidly affixed to the lower gripper 112.

The front support legs 114, 116 are rotatable or radially pivotable around the vertical axis of the center. The arches 124, 126 formed by the forward extension of the vertical member 106, 108 creates a frame on each side of the grill member 102, ensuring that the grill member 102 may be placed lower than said arches 124, 126, in effect allowing them to not be affected by any fire under the grill member 102.

In this fashion, the support legs 114, 116 can be rotated to form the open ended of a Y configuration with said two legs forming the diverging fork portion of the Y, straddling the fire 128. The rear legs 118 and 120 are similarly placed in the back, and opened to form either a Y (single leg) or H (dual). That radial positioning of the front and rear support legs will support the grill member 102, and prevent it from tipping over. None of the front support legs 114, 116 have to be positioned below the grill member 102 itself, so that the fire 128 may burn without charring the legs 114, 116 yet prevent the grill member 102 from tipping.

The grill member 102 height adjustment or lifting mechanism 122 is capable of maintaining said grill surface 102 level or substantially level throughout a range of height adjustments. The grill member 102 is joinable to a free end of the lifting member 122, which may have an optional rotatable element, so that the grill member 102 may be brought into/out of the hotter portions of the fire 128 area. Said tubular gripping members 110, 112 may be fixed by welding or other suitable fixed attachment means, including but not limited to mechanical fasteners such as nuts, bolts and screws, and chemical fasteners such as epoxy.

The attachment of the grill member 102 to the lifting mechanism 122 may be a accomplished by a pivotable connector which preferably includes a pair of pivot points defined by attachment pins, or a set screw along a sleeve, which are preferably threaded nuts attacked by threaded bolts to set against the surface of the vertical members 106, 108. The set screw may be a hex, or a butterfly (as shown), or any other suitable torqued device.

The lifting mechanism 122 works in conjunction with a similar set screw or option as described, while maintaining the grill member 102 substantially level. "Substantially level" is intended to indicate a degree of levelness suitable for maintaining grilling items on the grill surface 130, such that the grilling items do not roll off of the grilling surface 130. That is, the grill surface 130 can be raised and lowered without angular deflection of the grill surface 130 relative to the center posts 106, 108.

Referring to FIGS. 2-7, we see views that expose the various views of the proposed embodiment of the invention. When looking at the front view 200, a better appreciation can be had of the level grill member 102, the upper gripper 110 and the lower gripper 112. In addition, we see an auxiliary slip member 202 which is in one embodiment a sleeve with a set screw connected to a butterfly 204 to facilitate twisting.

This fixing of the grippers (110, 112, 202) and others to the vertical members 106, 108 is accomplished in one embodiment by a tubular structure which is adapted fit by a friction fit, however, any chemical or mechanical fastening means can be provided such as the set screws illustrated in the drawings.

The back 300 and top 400 shows that the grill member 102 support includes an aperture into which a portion of the grill member sleeve is inserted and rotatable therein. In one embodiment, the sleeve has a rotation limiting slot there through, so that a rotation-limiting lug may be affixed to the sleeve. The grill member 102 can therefore rotate only a limited distance between the positions where the limiting lug. This rotation-limiting feature prevents rotating the grill member 102 and the food thereon so far that the grill and stand may begin to tip.

Figure 6:
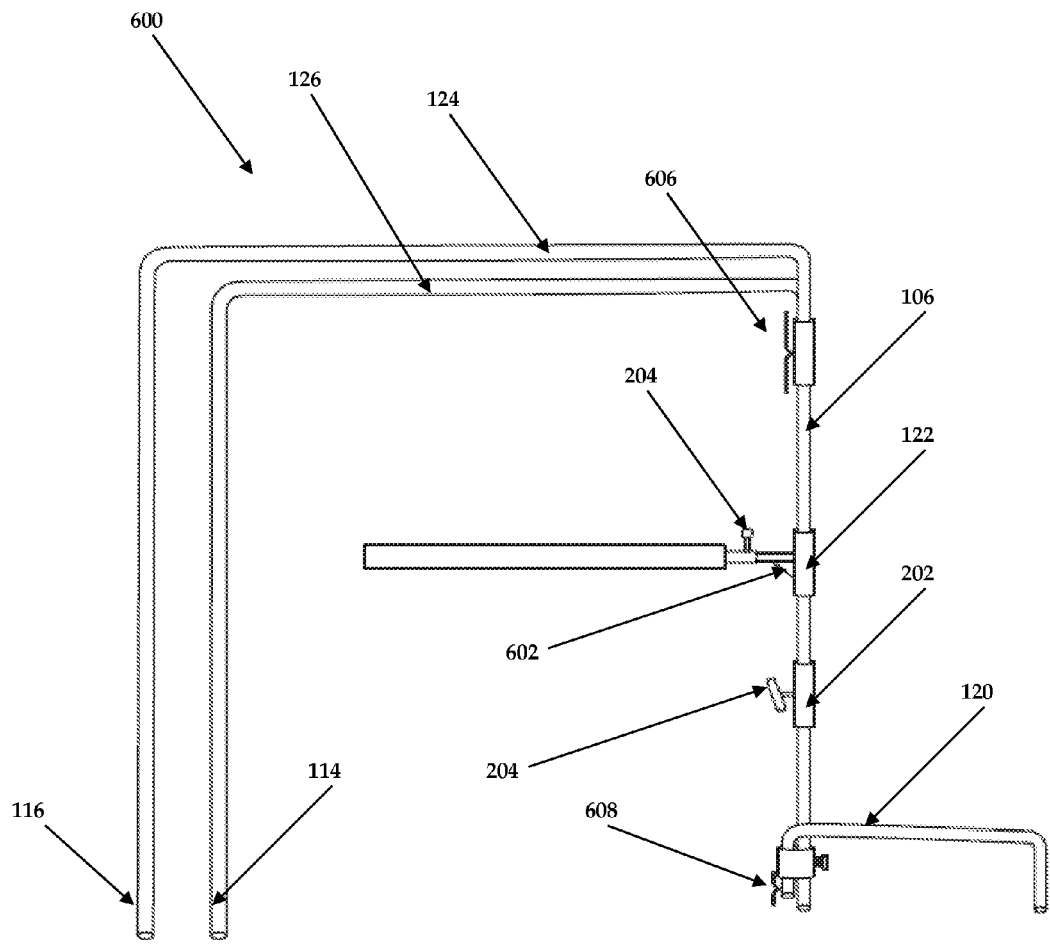
FIGS. 6-7 show side views of the Sportsman EZ Grill, according to illustrative embodiments of the invention.
Figure 7:
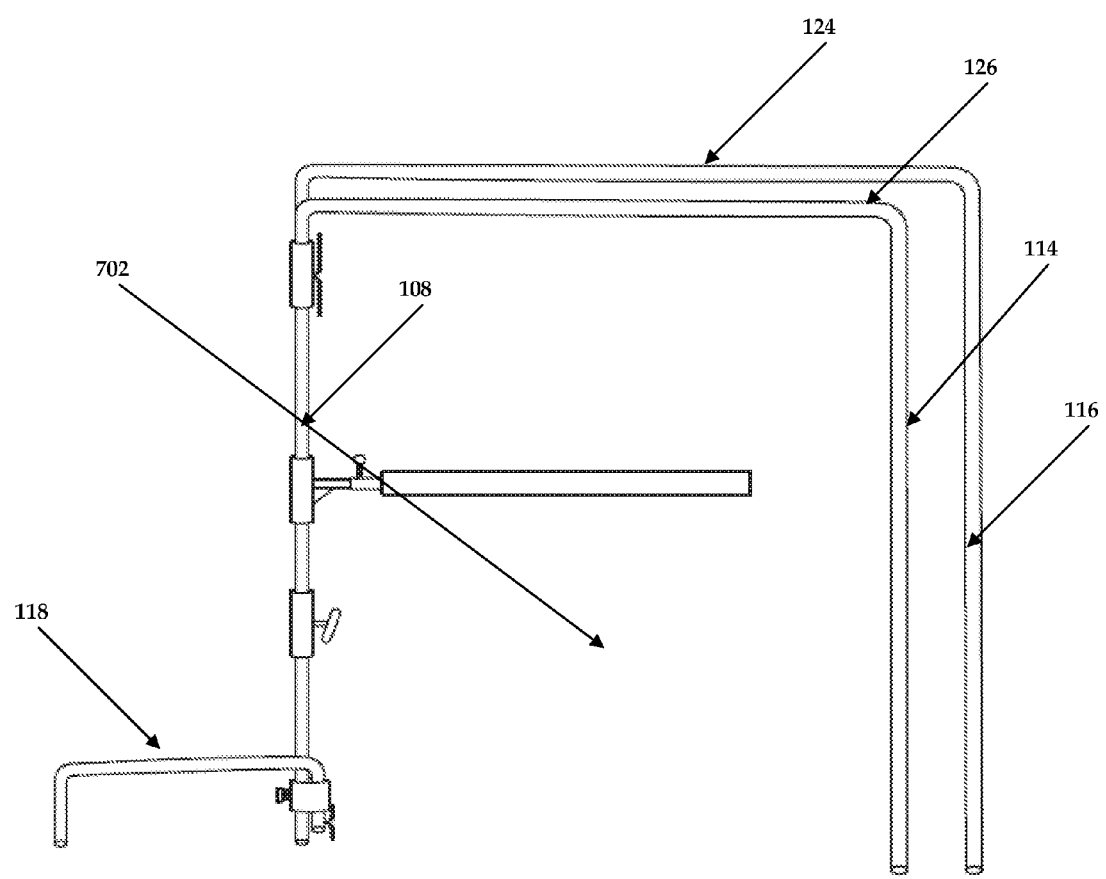

Referring now to FIGS. 6-7 we see a side view that illustrates another advantage of the EZ grill. The vertical members are not identical. There is a longer outer 106 member (whose distal end is 116), and a shorter member 108 (whose distal end is 114). This allows for the folding within each other's arches (the arch of longer member 106 is 124, and the arch of the shorter member 108 is 126) when the unit is folded for storage. When the legs are folded, the members nest together in vertical alignment. The one or more short legs 118, 120 similarly fold to be within the inside volume 702.

The grill member 102 may be stored by removal, or it may be loosened and rotated 90 degrees. The grill member 102 links to the vertical support member 106 at a height adjusting mechanism bracket 122. In one embodiment, an optional support tab 602 may be used to provide additional support to the grill member 102. In one embodiment, a cotter pin 606, 608 may be used to keep the vertical support member 106, 108 within the gripping member 110, 112, obviating the need for the set screw arrangement, allowing for the gripping member to rest vertically within the vertical element The above arrangement would be most suitable if a round cross-section were chosen for the members (106, 108 and others), although other cross sections (octagonal, hexagonal, square, etc.) may be used. Similarly, the assembly components directly exposed to flames or high heat (i.e. 102, 106, 108, 118, 120) may be assembled using ferrous and non-ferrous metals (steel, iron, aluminum, etc.), whereas those members less exposed to flames may be assembled of metal and/or other materials, phenolic materials, all non-ferrous polymers (including amorphous as well as semi-crystalline plastics), ceramics, wood, fiberglass, carbon fiber composites, epoxy composites and others.

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

I claim:

1. A folding portable grill comprising:
a center column assembly comprised of two or more vertical members held together by an upper gripper and a lower gripper, yet provide the ability to rotate each said member around said upper and lower grip point, each said vertical member being held by the lower gripper at said member's near end, each said member forming an arch between the distal and near end, with the apex of each arch being located above said upper gripper, wherein the first vertical member has an arch apex that is higher, and a distal end that is farther out from said center column than that of the second vertical member, and said second vertical member's arch apex is also higher and said distal end farther from the center column that any succeeding member;
one or more short legs connect to the lower gripper;
a grill member;
a grill member height adjustment mechanism connected to at least one said vertical member at a position between said upper and lower grippers;
wherein the arch and distal portions of the vertical members are pivotable to a storage position where said member portions nest within each other to the storage position, forming an inside volume, the short legs pivot to lie within said inside volume and the grill member is rotated within said inside volume in the storage position; and
the gripper mechanism stops the motion of the member within it by means of a set screw and a butterfly handle on said screw.

* * * * *